(12) United States Patent
Vesterinen

(10) Patent No.: US 7,075,923 B2
(45) Date of Patent: Jul. 11, 2006

(54) IP TELEPHONY GATEWAY—SOLUTION FOR TELECOM SWITCHES

(75) Inventor: Timo Vesterinen, Espoo (FI)

(73) Assignee: Nokia Corporation, Espoo (FI)

( * ) Notice: Subject to any disclaimer, the term of this patent is extended or adjusted under 35 U.S.C. 154(b) by 498 days.

(21) Appl. No.: 10/002,242

(22) Filed: Oct. 23, 2001

(65) Prior Publication Data
US 2002/0093945 A1 Jul. 18, 2002

Related U.S. Application Data

(63) Continuation of application No. PCT/EP99/03352, filed on May 14, 1999.

(51) Int. Cl.
*H04L 12/66* (2006.01)
*H04L 12/28* (2006.01)

(52) U.S. Cl. .................. 370/352; 370/401; 370/420; 370/356

(58) Field of Classification Search .............. 370/400, 370/401, 352, 389, 420, 353, 356, 466, 467, 370/465, 252, 264, 351, 392, 426, 410; 379/265, 379/93.23, 219–221, 93.17, 142, 100.15
See application file for complete search history.

(56) References Cited

U.S. PATENT DOCUMENTS

| 6,122,364 A * | 9/2000 | Petrunka et al. ....... 379/265.02 |
| 6,452,922 B1 * | 9/2002 | Ho .............................. 370/352 |
| 6,529,499 B1 * | 3/2003 | Doshi et al. ................. 370/352 |
| 6,611,533 B1 * | 8/2003 | Liao et al. .................... 370/467 |
| 6,636,596 B1 * | 10/2003 | Gallant et al. ......... 379/220.01 |
| 6,657,957 B1 * | 12/2003 | Cheung et al. ............. 370/230 |
| 6,731,642 B1 * | 5/2004 | Borella et al. .............. 370/401 |
| 6,829,232 B1 * | 12/2004 | Takeda et al. .............. 370/352 |
| 6,829,243 B1 * | 12/2004 | Sundhar ..................... 370/401 |

FOREIGN PATENT DOCUMENTS

| EP | 0841831 A2 | 5/1998 |
| WO | WO 98/20646 | 11/1997 |
| WO | WO 98/44703 | 10/1998 |

OTHER PUBLICATIONS

Thom G.A.: "H. 323: The Multimedia Communications Standard for Local Area Networks," IEEE Communications Magazine, vol. 34, No. 12, p. 52-56, Dec. 1996.

(Continued)

*Primary Examiner*—Hanh Nguyen
(74) *Attorney, Agent, or Firm*—Squire, Sanders & Dempsey L.L.P.

(57) ABSTRACT

The present invention discloses a network control device (CPS) for controlling data transfer in a first network (IP), wherein the data transfer is supplied from a second network (SCN) via a switch device (SD) adapted to control the second network (SCN) and an interface establishing device (GW) connected between the switch device (SD) and the first network (IP), and said network control device (CPS) controls the interface establishing device (GW) by using signalling associated with the first network (IP). By applying the network control device according to the invention, a gateway between the first and the second network can easily be installed.

6 Claims, 4 Drawing Sheets

OTHER PUBLICATIONS

"Series H: Audiovisual and Multimedia Systems," H.245 (Jul. 2001).

"Telecommunications and Internet Protocol Harmonization Over Networks (TIPHON); Network Architecture and Reference Configurations; Phase II: Scenario 1+ Scenario 2," TS 101 313 v0.4.2 (Feb. 1999).

"Series H: Transmission of Non-Telephone Signals, Infrastructure of Audiovisual Services—Transmission Multiplexing and Synchronization," H.225.0 (Nov. 1996).

"Series H: Audiovisual and Multimedia Systems Infrastructure of Audiovisual Services—Communication Procedures," H.246 (Feb. 1998).

"Series H: Audiovisual and Multimedia Systems Infrastructure of Audiovisual Services—Systems and Terminal Equipment for Audiovisual Servies," H.323 (Feb. 1998).

"Series H: Audiovisual and Multimedia Systems Supplementary Services for Multimedia," H.450.1 (Feb. 1998).

* cited by examiner

IP TELEPHONY GATEWAY—SOLUTION FOR TELECOM SWITCHES

This application is a continuation of international application serial number PCT/EP99/03352, filed 14 May 1999.

FIELD OF THE INVENTION

The present invention relates to a network control device and an interface establishing means.

BACKGROUND OF THE INVENTION

In the following, some network elements important for the background of the invention are described by referring to FIG. 1.

In FIG. 1, two different networks are shown, an IP based network and a circuit switched network SCN like a public switched telephone network (PSTN) or a GSM network. These networks are connected by gateways GW1 and GW2, which are connected to switch devices SD1 and SD2, respectively. The switch devices SD1, SD2 and SD3 are conventional switches and serve to operate the SCN network. In detail, exchange terminals for a trunk line are connected to the switch devices. It is to be noted that for simplifying the illustration only an exchange terminal ET connected to the switch device SD3 is shown. Nevertheless, also the other switch devices SD1 and SD2 comprise exchange terminals.

Furthermore, an important network element for the IP network is a so-called gatekeeper. In FIG. 1, a gatekeeper GK connected to the IP network is shown as an example. In general, a gatekeeper is an element in a network, that is responsible for registration, admission and status (RAS) of terminals and gateways. The gatekeeper participates in zone management, call processing and call signalling according to the ITU-T recommendation H.323 and provides address translation. Thus, the gatekeeper determines the route for signalling and media transport (data transport) of call through the network. In this respect, the gatekeeper knows and controls the state of the IP telephony calls in an analogous way to a normal telecom switch (e.g., the switch device SD3) for a switched circuit network (SCN), like GSM or a normal PSTN. The gatekeeper GK normally handles IP telephony calls by using IP signalling, for example H.323 signalling or other relevant IP signallings like SIP (Session Initiation Protocol).

To the IP network a terminal TE is connected, which can be a computer with a telephone connected thereto, for example.

In the following, the gateways GW1 and GW2 connected to the switch devices SD1 and SD2, respectively, are described in more detail. A gateway provides an interface between two different networks, in the present case, between the SCN network and the IP network. Usually, a gateway is composed of a signalling gateway, a media gateway and a media gateway controller.

The signalling gateway provides the signalling mediation function between the IP domain and the SCN domain. It may support functional or signalling mediation between the IP domain (e.g., H.323) and call signalling in the SCN domain (e.g., channel associated signalling or non-channel associated signalling).

The media gateway provides media mapping and/or transcoding functions. It maps (e.g., tandemfree operation) or transcodes the media in the IP domain (media transported over IP) and the media in the SCN domain (e.g., PCM encoded voice, GSM, etc.).

The media gateway controller is located between the media gateway, the signalling gateway and the gatekeeper. It provides the call processing (call handling) function for the gateway. It controls the media gateways, it receives SCN signalling information from the signalling gateway and IP signalling from the gatekeeper.

Thus, the conventional gateway passes telephone traffic from the SCN network to the IP network by using IP telephony signalling used in the IP based telephony.

For this, it is necessary to provide the switch devices for special interfaces which are adapted to connect the gateways to the switch device. This results in a complicated handling of the gateways.

Furthermore, it is necessary to provide the switch devices with special control elements related to the gateways, which are different to the normal exchange terminals. Hence, a complicated hardware structure of the switch devices are necessary.

SUMMARY OF THE INVENTION

Thus, the object underlying the invention is to eliminate the above drawbacks and to enable an easy installation of new IP telephony interfaces (gateways) between conventional switch devices and an IP network.

This object is solved by a network control device for controlling data transfer in a first network, wherein the data transfer is supplied from a second network via a switch device adapted to control the second network and an interface establishing device connected between the switch device and the first network, and said network control device controls the interface establishing device by using signalling associated with the first network.

Furthermore, the above object is solved by an interface establishing device for providing an interface between a first network and a second network, wherein the interface establishing device is adapted to receive data from the second network by using signalling associated with the second network and to transmit the data to the first network by using signalling associated with the first network.

Alternatively, the above object is solved by a method for controlling a network system comprising a first network, a second network, an interface establishing device providing interface between the networks, and a switch device to which the interface establishing device is connected and which controls the second network, the method comprising the steps of controlling the interface establishing device via the first network by using signalling associated with the first network, controlling the switch device via the first network by using signalling associated with the second network.

By the above method, the signalling and data transfer between the switch device and the gateway is performed in the same way as the signalling and data transfer between the switch device and a normal exchange terminal.

Therefore, it is not necessary to provide the switch devices with special interfaces which are adapted to connect the gateways to the switch device. Furthermore, the switch devices do not have to be equipped with special control elements related to the gateways, which are different to the normal exchange terminals.

Hence, an easy handling of the gateways is possible. That is, according to the invention a telecom operator is enabled to install easily new IP telephony interfaces (gateways) between conventional switch devices and the IP network.

This is valid both for fixed (wireline) networks like the normal public switched telephone network (PSTN) and mobile networks like GSM. The invention can be applied even for various access server solutions, which are needed to provide telecom subscribers with Internet connections.

Further advantageous developments are defined in the dependent claims.

BRIEF DESCRIPTION OF THE DRAWINGS

The present invention will be more readily understood with reference to the accompanying drawings in which.

DETAILED DESCRIPTION OF PREFERRED EMBODIMENTS

In the following, a preferred embodiment of the invention is described in more detail with reference to the accompanying drawings.

Figure 2:
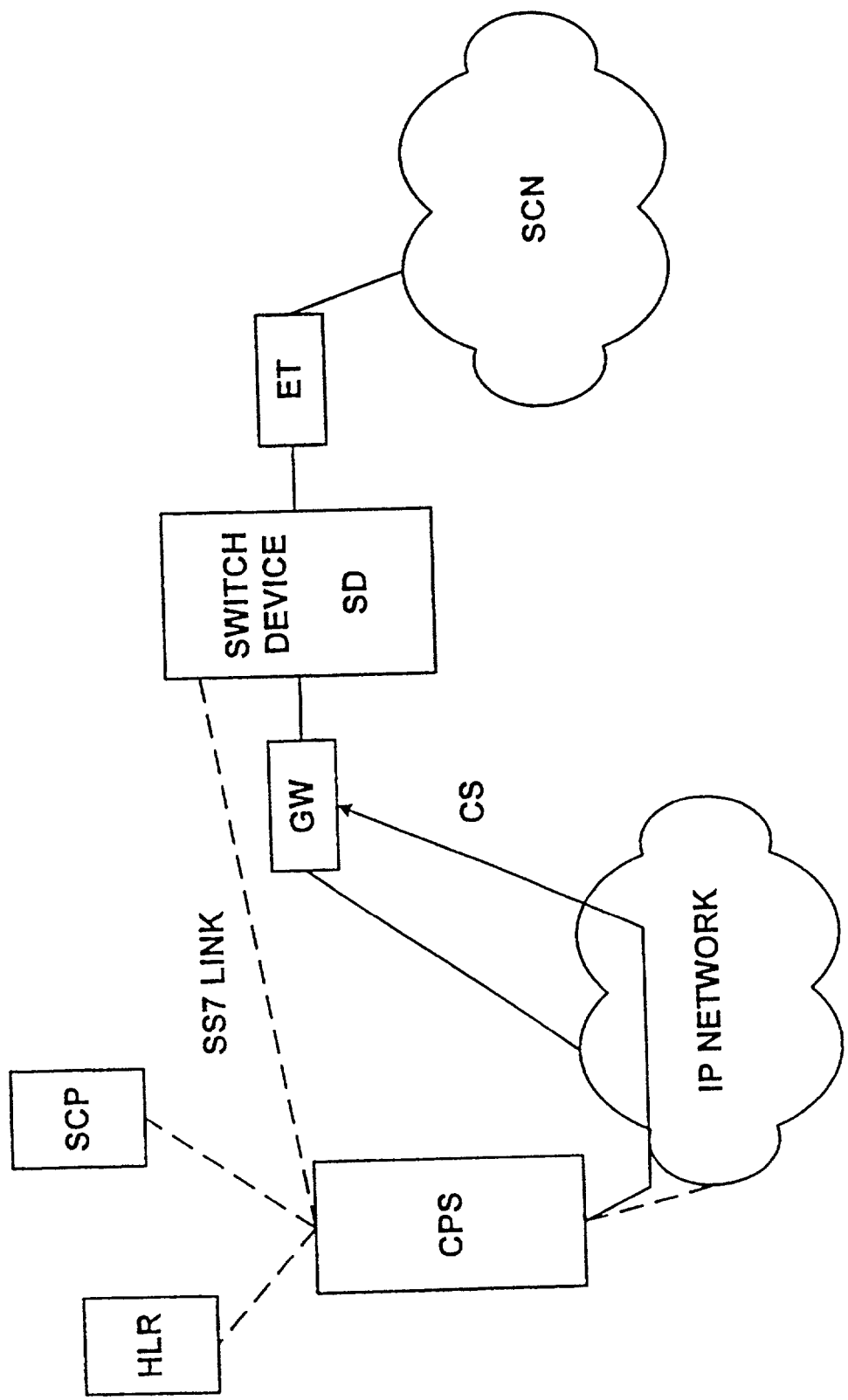
FIG. 2 shows two different networks connected by a gateway according to an embodiment of the invention.

The invention is based on a separate network element called Call Processing Server (CPS), which is the same as or a part of a gatekeeper (GK) according to the IP specification H.323. In the following, the Call Processing Server is referred to as CPS network element. The CPS network element is normally handling IP telephony calls by using H.323 signalling or other relevant IP signallings like SIP (Session Initiation Protocol). According to this invention, the CPS network element supports even a common channel signalling (SS7, i.e. signalling system number 7) widely used in telecom networks, as shown in FIG. 2. It is noted that in FIG. 2 the CPS network element is denoted with the reference sign CPS. Furthermore, in the example of FIG. 2 the CPS network element and the gatekeeper are constructed as one unit. Nevertheless, both units can be constructed as separate units.

Figure 1:
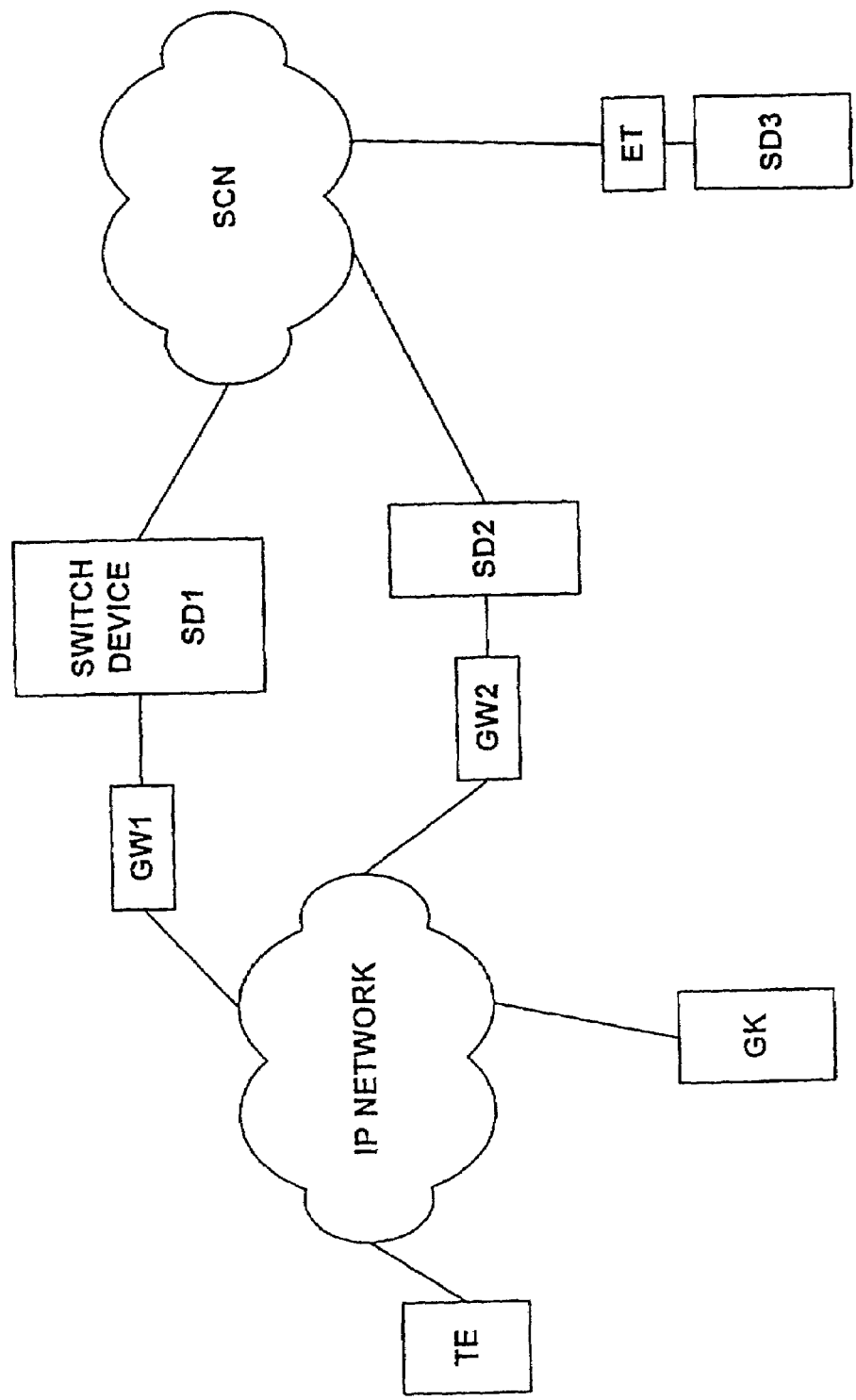
FIG. 1 shows two different networks connected by a gateway according to the prior art.

FIG. 2 shows two different networks, an IP based network and a circuit switched network SCN like a public switched telephone network (PSTN) or a GSM network, as FIG. 1.

These networks are connected by a gateway GW, which is connected to a switch device SD. The switch device SD is adapted to operate the SCN network. In detail, to the switch device SD an exchange terminal ET for a trunk line is connected.

In the following, the installation and use of the gateway (IP gateway unit) GW is described.

The gateway GW is functioning towards the switch device SD and the corresponding exchange software included therein like an exchange terminal ET for a trunk line (e.g., E1/T1, 2 Mbits/s PCM line in Europe). The gateway can be a plug-in-unit in an integrated case. Thus, the installation is easy because in this manner, the gateway plug-in-unit simply replaces an ET plug-in-unit. Therefore, the gateway can also be referred to as an IP exchange terminal (IPET). Nevertheless, it is also possible to provide an external unit with several ET standard interfaces, to which gateways can be connected.

The gateway GW includes on the IP network side an IP interface, IP protocols and the logic which provides conversion (DSP digital signal processing) between the audio signals carried on telephone circuits and data packets carried over the IP network.

The CPS network element controls the gateway GW from the IP network side. This is indicated in FIG. 2 by the control signal CS which is transmitted from the CPS network element to the gateway GW via the IP network. The CPS network element is capable to control a plurality gateway units, which might be installed in a plurality of switch devices.

The CPS network element controls the gateway GW, as mentioned above. In detail, the CPS network element loads the software necessary for the gateway GW over the IP network. Furthermore, it controls the parameters of the gateway GW. Moreover, it controls the telephone traffic according to the signalling.

With respect to the signalling, it is noted that the CPS network element includes the signalling software both for IP telephony (H.323, SIP) and SS7 signalling (such as ISUP=ISDN user part) used in telecom network.

As a call is routed from the switched circuit network SCN (like a PSTN) to the IP network, the switch device SD signals with the CPS network element by using ISUP signalling over the SS7 link just as it normally does with other telecom switch devices, to which a corresponding call is directed to. The CPS network element routes the call forward to the IP network by using IP telephony signalling (H.323) with the target and sends the correct target IP address to the gateway GW which takes care of the call in the "outgoing trunk" of the switch device SD. This is shown in FIG. 3 which is described in the following.

Figure 3:
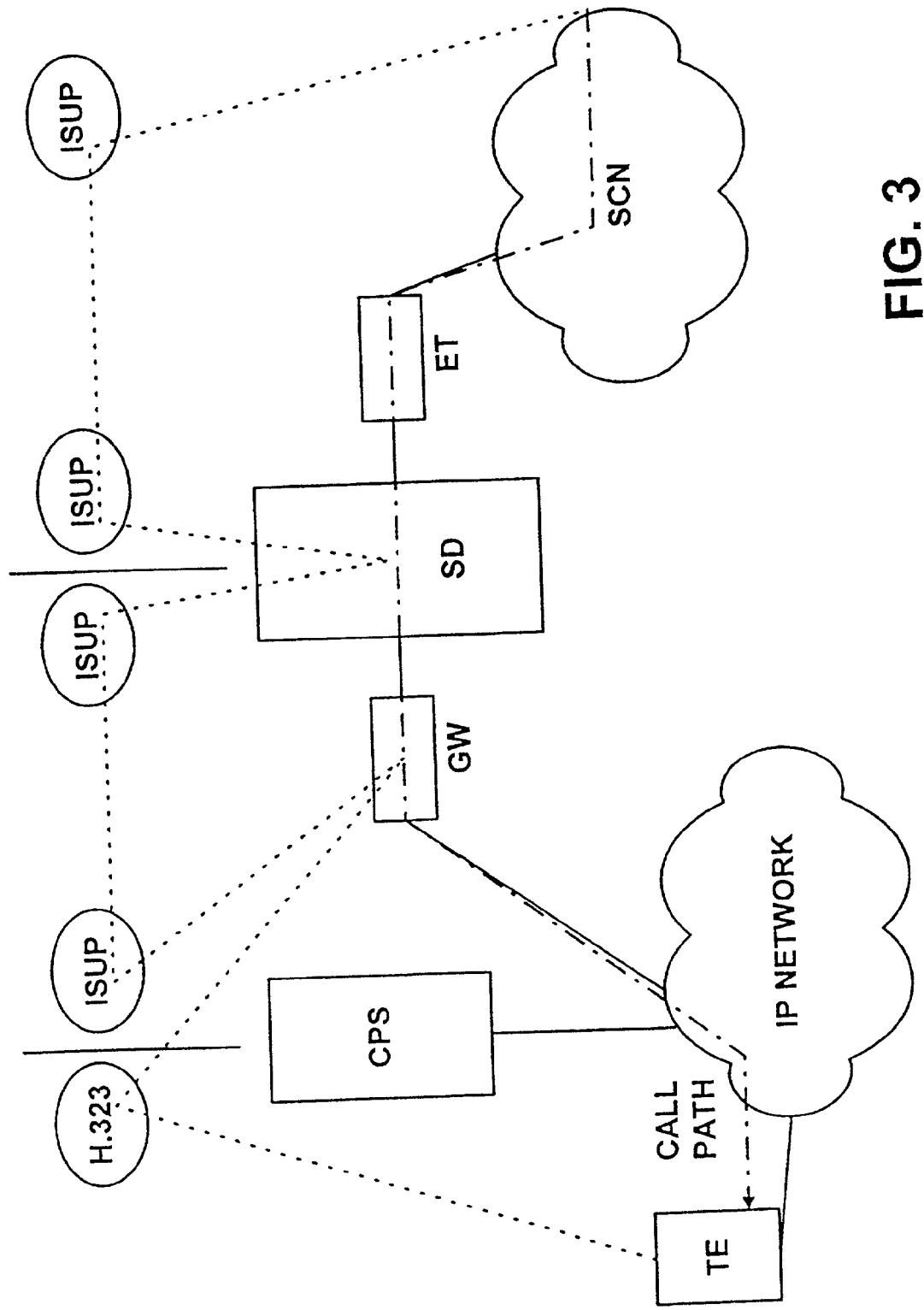
FIG. 3 shows signalling of a call routed through the networks according to the embodiment of the invention.

FIG. 3 shows two networks IP and SCN connected via the gateway GW. Same reference characters as in FIG. 2 refer to same elements as shown in FIG. 2, thus, a description of these elements is omitted.

In the network system shown in FIG. 3, a terminal TE is connected to the IP network. This terminal can be a computer with a telephone connected thereto, for example.

Furthermore, a call path is illustrated by a dash-dotted line. The origin of the call is located in the SCN network. The call is transmitted via the exchange terminal ET to the switch device SD, from which it is sent to the gateway GW. Then, the call is routed through the IP network from the gateway GW to the terminal TE.

The dotted lines shown in FIG. 3 indicate the signalling used. From the origin in the SCN network to the switch device, ISUP signalling (over SS7) is used, for example. This call "routing" (call forwarding) in the SCN network is performed in a conventional manner.

However, the call forwarding from the switch device SD to the gateway GW is also performed by using ISUP signalling. Thus, the function of the gateway GW is for the switch device SD the same as that of the exchange terminal ET.

As described above, the use of the ISUP signalling is performed under the control of the CPS network element. For routing the call through the IP network, an IP signalling is required. As an example, the H.323 signalling is shown. The routing of the call by using the H.323 signalling starts in the gateway GW, such that the gateway GW is controlled by the CPS network element by using both the signalling for the SCN network (i.e., ISUP signalling) and the signalling for the IP network (i.e., H.323 signalling).

By this measure, the switching device can treat the gateway GW in the same way as it would treat an exchange terminal in the same place.

Furthermore, in practice the gateway GW and the exchange terminal ET are both constructed as plug-in-units which are inserted in slots. Both of these units can be constructed such that they can be inserted in the same type of slot, hence, have the same connection inputs and outputs. Thus, a gateway plug-in-unit can be inserted in the same place where an exchange terminal plug-in-unit has been before. This measure also enables easy installing of the gateways.

As mentioned above, the invention is based on the separate network element Call Processing Server (CPS), which includes the signalling software used in both SCN and IP network telephony. Furthermore, the CPS network element controls gateways of conventional switch devices. According to the invention, the gateways function like traditional trunk line interfaces (exchange terminals). Therefore, it is not necessary to modify an existing conventional switch device. Thus, a software upgrade in switch device is not required, for example. Moreover, the software used in the gateways can easily be maintained.

Furthermore, the IP interface (i.e., the gateway) does not bring any new functions which affect the switch device software. Therefore, the gateways controlled by the CPS network element according to the invention can easily be installed in existing switch devices.

Moreover, a network system can easily be updated with the CPS network elements according to the invention, since the gateways according to the invention can be used while conventional gatekeepers and conventional gateways are still present in the IP network. Therefore, an introduction of the new CPS network elements (i.e., the network control devices) according to the invention can be easily and smoothly effected.

Furthermore, all IP related functions of the gateway are controlled by the CPS network element from IP network side.

The calls which are forwarded from an origin in the SCN network to trunk lines and finally to the IP network via gateways are signalled with the ISUP signalling between the CPS network element and the switch.

The CPS network element uses the IP telephony signalling in the IP network (e.g., with H.323 terminal) when calls are forwarded to IP users and passes the IP address gateway unit.

Although not described above, a call can also be transmitted from the IP network to the SCN network with the same signalling as shown in FIG. 3. That is, the routing directions are working in the same way in both directions and the call from IP network PSTN is routed in the corresponding way.

Moreover, it has to be noted that the networks concerned do not have to be different from each other. That is, although the connection of a switched circuit network SCN and a packet switched network (IP network) were shown as examples for the networks, it is also possible that both networks are basically of the same type (e.g., packet switched), and that the only difference between them is the use of a different signalling.

Figure 4:
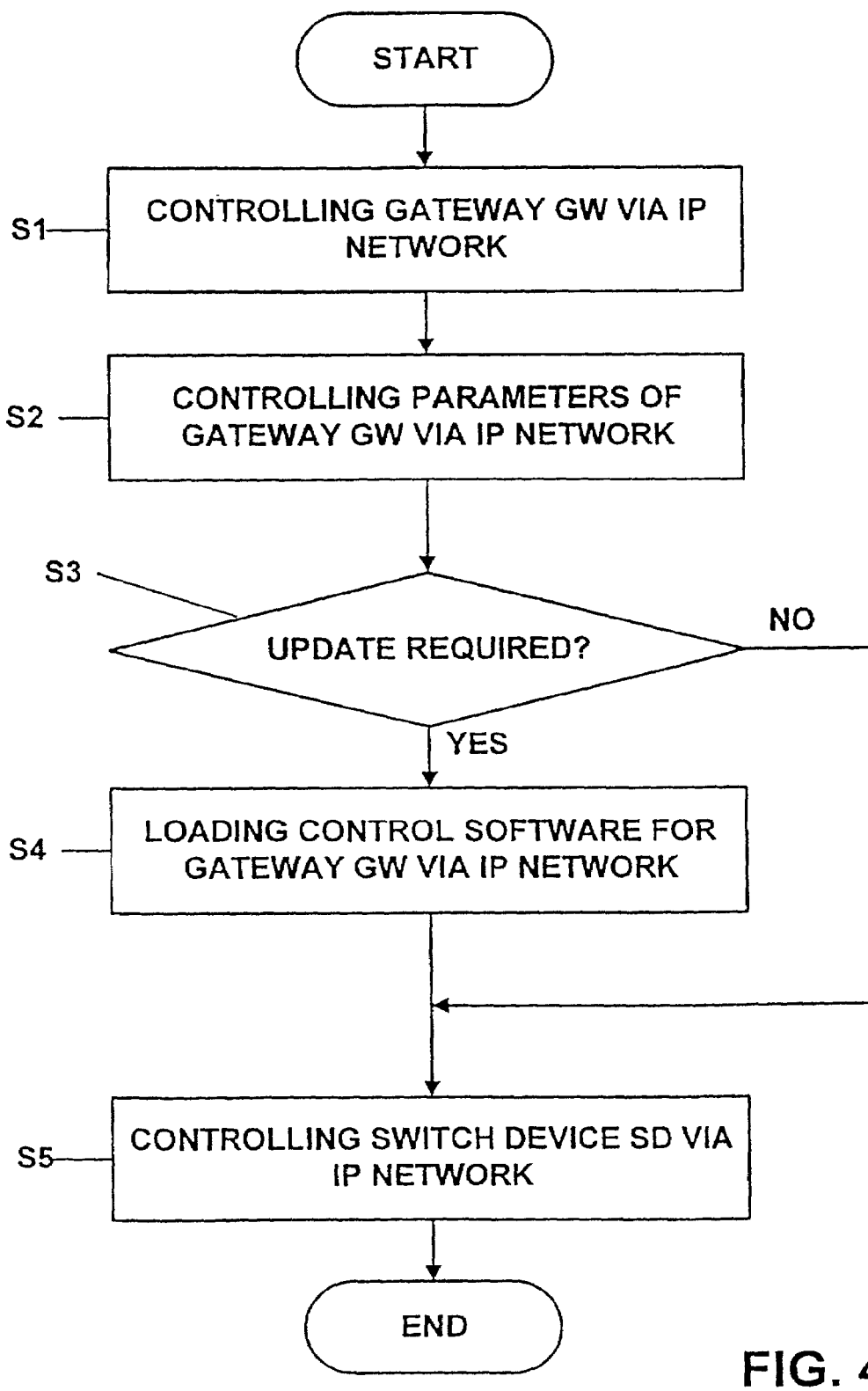
FIG. 4 shows a flowchart illustrating the method according to the embodiment of the invention.

In the following, the method according to the invention is described with respect to the flowchart shown in FIG. 4, in which the basic idea of the invention is summarized. This method is performed by the call processing server CPS.

In step S1, the gateway GW is controlled via the IP network by using H.323 signalling. This control of the gateway GW is further described in steps S2 to S4. That is, in step S2 the parameters of the gateway GW are controlled via the IP network. Then, in step S3 it is decided whether an update of the gateway GW is required. For example, this can be necessary in case a new gateway GW is connected to the switch device SD. Then, the software actually needed has to be loaded via the IP network in step S4. This measure serves to provide a very easy installing of new gateways, i.e., IP telephony interfaces by simply inserting the gateway units in the corresponding slot of the switch device SD, for example, and loading the required software via the IP network. Hence, the switch device SD is not required to perform any control associated with the IP telephony. Furthermore, the switch device SD is also controlled via the IP network in step S5. It has to be noted that the control of the switch device only includes the control with respect to the gateway GW. Furthermore, as mentioned above, this control is performed by using the ISUP signalling.

It has to be noted that the signalling used for the SCN network is not limited to the ISUP signalling, but also other suitable signalling can be used. Likewise, the signalling for the IP network is not limited to H.323 signalling, but also other suitable siganlling can be used.

Thus, according to the invention a telecom operator is enabled to install easily new IP telephony interfaces (gateways) between conventional switch devices and the IP network. This is valid both for fixed (wireline) networks like the normal public switched telephone network (PSTN) and for mobile networks like GSM. The invention can be applied even for various access server solution, which are needed to provide telecom subscribers with Internet connections.

The above description and accompanying drawings only illustrate the present invention by way of example. Thus, the embodiments of the invention may vary within the scope of the attached claims.

The invention claimed is:

1. An interface establishing device for providing an interface between a first network and a second network,
   wherein said interface establishing device is adapted to receive data from said second network by using signalling associated with said second network and to transmit said data to said first network by using signalling associated with said first network,
   wherein said interface establishing device is configured to receive control software for said interface establishing device from a network control device via said first network and is configured such that parameters thereof are controlled by said network control device,
   wherein said interface establishing device is connectable to a switch device adapted for controlling said second network, said switch device includes at least one connecting means for connecting an exchange terminal for a trunk line,
   wherein said interface establishing device is adapted to be connected to one of said connecting means in place of said exchange terminal.

2. The interface establishing device according to claim 1, wherein said interface establishing device is adapted to receive control signals from said network control device being remotely located from said interface establishing device.

3. The interface establishing device according to claim 1, wherein said connecting means is a slot, and said exchange terminal and said interface establishing device are constructed as plug-in-units such that both said exchange terminal and said interface establishing means can be inserted in said slot.

4. A network system comprising:

an interface establishing device, wherein said interface establishing device is adapted to receive data from said second network by using signalling associated with said second network and to transmit said data to said first network by using signalling associated with said first network, wherein said interface establishing device is configured to receive control software for said interface establishing device from a network control device via said first network and is configured such that parameters thereof are controlled by said network control device, and wherein said interface establishing device is connectable to a switch device adapted for controlling said second network, said switch device comprises at least one connecting means for connecting an exchange terminal for a trunk line, wherein said interface establishing device is adapted to be connected to one of said connecting means in place of said exchange terminal, wherein said data transfer is supplied from a second network via said switch device adapted to control said second network and said interface establishing device connected between said switch device and said first network; and a network control device for controlling data transfer in a first network, wherein said network control device controls said interface establishing device by using signalling associated with said first network, and controls parameters of said interface establishing device, wherein said network control device loads control software for said interface establishing device via said first network into said interface establishing devices.

5. The network system according to claim 4, wherein said network control device controls a plurality of switch devices and interface establishing devices via said first network.

6. The network system according to claim 4, wherein said first network is an IP based network and said second network is a switched circuit network.

* * * * *